(12) United States Patent
Endo

(10) Patent No.: US 9,037,333 B2
(45) Date of Patent: May 19, 2015

(54) HYBRID VEHICLE AND CONTROL METHOD THEREFOR

(71) Applicant: Hiroki Endo, Nissin (JP)

(72) Inventor: Hiroki Endo, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/138,227

(22) Filed: Dec. 23, 2013

(65) Prior Publication Data

US 2014/0180517 A1  Jun. 26, 2014

(30) Foreign Application Priority Data

Dec. 26, 2012 (JP) ................................. 2012-282654

(51) Int. Cl.
| | |
|---|---|
| B60W 10/00 | (2006.01) |
| B60W 20/00 | (2006.01) |
| B60W 10/06 | (2006.01) |
| B60W 10/08 | (2006.01) |
| B60W 10/26 | (2006.01) |
| B60K 6/445 | (2007.10) |

(52) U.S. Cl.
CPC ........... *B60W 20/1062* (2013.01); *B60W 10/06* (2013.01); *B60W 10/08* (2013.01); *B60W 10/26* (2013.01); *Y10S 903/93* (2013.01); *B60K 6/445* (2013.01); *B60W 2510/085* (2013.01); *B60W 2710/0644* (2013.01); *Y02T 10/6286* (2013.01); *Y02T 10/6239* (2013.01); *Y02T 10/7258* (2013.01)

(58) Field of Classification Search
USPC .................... 701/22, 36; 307/9.1, 10.1, 10.7; 903/902–903, 907; 180/65.1, 65.21, 180/65.265, 65.275, 65.28, 65.285
See application file for complete search history.

(56) References Cited

U.S. PATENT DOCUMENTS

| | | | | |
|---|---|---|---|---|
| 5,568,023 | A * | 10/1996 | Grayer et al. ................. | 318/139 |
| 6,232,729 | B1 | 5/2001 | Inoue | |
| 8,013,394 | B2 * | 9/2011 | Chinthakindi et al. ....... | 257/358 |
| 2007/0220883 | A1 * | 9/2007 | Harada et al. .................. | 60/597 |
| 2008/0228334 | A1 * | 9/2008 | Hashimoto ..................... | 701/22 |
| 2009/0131215 | A1 * | 5/2009 | Shamoto .......................... | 477/3 |
| 2011/0015819 | A1 | 1/2011 | Goto et al. | |
| 2012/0109438 | A1 * | 5/2012 | Akebono et al. ................ | 701/22 |
| 2012/0203406 | A1 * | 8/2012 | Akebono et al. ................ | 701/22 |
| 2012/0207620 | A1 * | 8/2012 | Dalum et al. ................ | 417/44.1 |
| 2013/0297123 | A1 * | 11/2013 | Gibson et al. ................... | 701/22 |
| 2014/0136039 | A1 * | 5/2014 | Tanishima et al. .............. | 701/22 |

FOREIGN PATENT DOCUMENTS

| | | |
|---|---|---|
| JP | 07-264709 A | 10/1995 |
| JP | 2000-291451 A | 10/2000 |
| JP | 2004-328961 A | 11/2004 |
| JP | 2009-173167 A | 8/2009 |
| JP | 2011-024353 A | 2/2011 |
| JP | 2011-068211 A | 4/2011 |
| JP | 2011-201394 A | 10/2011 |

* cited by examiner

*Primary Examiner* — Yonel Beaulieu
(74) *Attorney, Agent, or Firm* — Gifford, Krass, Sprinkle, Anderson & Citkowski, P.C.

(57) ABSTRACT

A hybrid vehicle includes a controller that executes control such that a second motor is regeneratively driven within the range of input and output limits of a high-voltage battery that exchanges electric power with the second motor that outputs power for traveling without running an engine using a first motor when charging electric power is smaller than the input limit of the high-voltage battery and an EV traveling priority mode is set. The invention also relates to a control method for the hybrid vehicle.

8 Claims, 8 Drawing Sheets

HYBRID VEHICLE AND CONTROL METHOD THEREFOR

INCORPORATION BY REFERENCE

The disclosure of Japanese Patent Application No. 2012-282654 filed on Dec. 26, 2012 including the specification, drawings and abstract is incorporated herein by reference in its entirety.

BACKGROUND OF THE INVENTION

1. Field of the Invention

The invention relates to a hybrid vehicle. Specifically, the invention relates to a hybrid vehicle including an engine configured to output power for traveling, a first motor configured to run the engine, a second motor configured to output power for traveling, a battery configured to exchange electric power with the first motor and the second motor, and a controller configured to control the engine, the first motor, and the second motor such that a requested braking force acts on the vehicle when the second motor is regeneratively driven. The invention also relates to a control method for the hybrid vehicle.

2. Description of Related Art

As the hybrid vehicle of this type, there is proposed a hybrid vehicle including an engine, a first motor generator as a drive source, a second motor generator provided in the engine, and a battery to which electric power from the first and second motor generators is supplied (see, e.g., Japanese Patent Application Publication No. 2011-201394 (JP 2011-201394 A)). In this hybrid vehicle, during traveling only by the first motor generator before the engine is started, when the vehicle is decelerated in a case where the cooling water temperature of the engine is less than a warming completion temperature, together with braking by regeneration to the battery, the engine is forcibly rotated by the second motor generator and the electric power of the battery is consumed by the second motor generator, whereby the overcharge of the battery is prevented.

SUMMARY OF THE INVENTION

However, although the overcharge of the battery is prevented in the above-described hybrid vehicle, since the engine is forcibly rotated by the second motor generator, vibrations caused by the rotation of the engine occur. Such vibrations give uncomfortable feeling to a driver so that it is preferable to suppress the vibrations. In particular, when priority is given to a motor traveling in which the operation of the engine is stopped over a hybrid traveling in which the vehicle travels by using powers from the engine and the motor, such vibrations caused by the rotation of the engine are not expected by the driver so that it is preferable to suppress the vibrations as much as possible.

The invention provides the hybrid vehicle that prevents the battery from being charged with excessive electric power and suppresses vibrations caused by the rotation of the engine when priority is given to the motor traveling over the hybrid traveling.

A hybrid vehicle of a first aspect of the invention is a hybrid vehicle including: an engine configured to output power for traveling, a first motor configured to run the engine, a second motor configured to output power for traveling, a battery configured to exchange electric power with the first motor and the second motor, and a controller configured to control the engine, the first motor, and the second motor such that a requested braking force acts on the hybrid vehicle when the second motor is regeneratively driven. The controller is configured to, when regenerative electric power from the second motor exceeds a maximum charging electric power and priority is given to a motor traveling over a hybrid traveling, control the engine, the first motor, and the second motor such that the second motor is regeneratively driven within a range of the maximum charging electric power while rotation of the engine is limited to a level lower than a level when the regenerative electric power from the second motor does not exceed the maximum charging electric power. Here, the maximum charging electric power is a maximum value of electric power that can be used to charge the battery. In the motor traveling, operation of the engine is stopped and the hybrid vehicle travels by using power from the second motor. In the hybrid traveling, the hybrid vehicle travels by using power from the engine and the power from the second motor.

In the hybrid vehicle of the aspect of the invention, the engine, the first motor, and the second motor are controlled when the regenerative electric power from the second motor exceeds the maximum charging electric power as the maximum value of electric power that can be used to charge the battery and priority is given to the motor traveling in which the operation of the engine is stopped and the hybrid vehicle travels by using the power from the second motor over the hybrid traveling in which the hybrid vehicle travels by using the power from the engine and the power from the second motor such that the second motor is regeneratively driven within the range of the maximum charging electric power while the rotation of the engine is limited to a level lower than a level when the regenerative electric power from the second motor does not exceed the maximum charging electric power. With this, it is possible to prevent the battery from being charged with excessive electric power, and suppress vibrations caused by the rotation of the engine.

In the hybrid vehicle of the aspect of the invention, the controller may give priority to the motor traveling over the hybrid traveling when a power storage amount of the battery is larger than a predetermined value or when a motor traveling switch that issues a command for the motor traveling is turned on. With this, it is possible to prevent the battery from being charged with excessive electric power when the power storage amount of the battery is larger than or equal to the predetermined value or when the motor traveling switch is turned on.

In addition, the hybrid vehicle of the aspect of the invention may further include a display device configured to display information, and the controller may control the display device such that the information indicating that the rotation of the engine is limited is displayed when the charging electric power exceeds the maximum charging electric power. With this, it is possible to prevent a situation in which a driver feels uncomfortable due to the limitation on the rotation of the engine.

Further, the hybrid vehicle of the aspect of the invention may further include a friction brake device configured to apply braking by a frictional force to the hybrid vehicle, and the controller may control the engine, the first motor, the second motor, and the friction brake device such that the requested braking force acts on the hybrid vehicle when the charging electric power exceeds the maximum charging electric power. With this, it is possible to apply a sufficient braking force to the vehicle even when the charging electric power exceeds the maximum charging electric power.

Furthermore, the hybrid vehicle of the aspect of the invention may further include a planetary gear having three rotary elements that are connected to a drive shaft coupled to an axle shaft, an output shaft of the engine, and a rotating shaft of the first motor respectively. The rotating shaft of the second motor may be connected to the drive shaft. In this case, the hybrid vehicle of the aspect of the invention may also include a charger connected to an external power source and configured to charge the battery by using electric power from the external power source.

A hybrid vehicle of a second aspect of the invention is a hybrid vehicle including: an engine configured to output power for traveling, a first motor configured to run the engine, a second motor configured to output power for traveling, a battery configured to exchange electric power with the first motor and the second motor, and control means for controlling the engine, the first motor, and the second motor such that a requested braking force acts on the hybrid vehicle when the second motor is regeneratively driven. The control means controls, when regenerative electric power from the second motor exceeds a maximum charging electric power and priority is given to a motor traveling over a hybrid traveling, the engine, the first motor, and the second motor such that the second motor is regeneratively driven within a range of the maximum charging electric power while rotation of the engine is limited to a level lower than a level when the regenerative electric power from the second motor does not exceed the maximum charging electric power. Here, the maximum charging electric power is a maximum value of electric power that can be used to charge the battery. In the motor traveling, operation of the engine is stopped and the hybrid vehicle travels by using power from the second motor. In the hybrid traveling, the hybrid vehicle travels by using power from the engine and the power from the second motor.

A third aspect of the invention is a control method for a hybrid vehicle including: an engine configured to output power for traveling, a first motor configured to run the engine, a second motor configured to output power for traveling, a battery configured to exchange electric power with the first motor and the second motor. The control method comprises i) controlling the engine, the first motor, and the second motor such that a requested braking force acts on the hybrid vehicle when the second motor is regeneratively driven, ii) controlling, when regenerative electric power from the second motor exceeds a maximum charging electric power and priority is given to a motor traveling over a hybrid traveling, the engine, the first motor, and the second motor such that the second motor is regeneratively driven within a range of the maximum charging electric power while rotation of the engine is limited to a level lower than a level when the regenerative electric power from the second motor does not exceed the maximum charging electric power. Here, the maximum charging electric power is a maximum value of electric power that can be used to charge the battery. In the motor traveling, operation of the engine is stopped and the hybrid vehicle travels by using power from the second motor. In the hybrid traveling, the hybrid vehicle travels by using power from the engine and the power from the second motor.

BRIEF DESCRIPTION OF THE DRAWINGS

Features, advantages, and technical and industrial significance of exemplary embodiments of the invention will be described below with reference to the accompanying drawings, in which like numerals denote like elements. and wherein.

DETAILED DESCRIPTION OF EMBODIMENTS

Next, a description will be given of a mode for carrying out the invention by using an embodiment.

Figure 1:
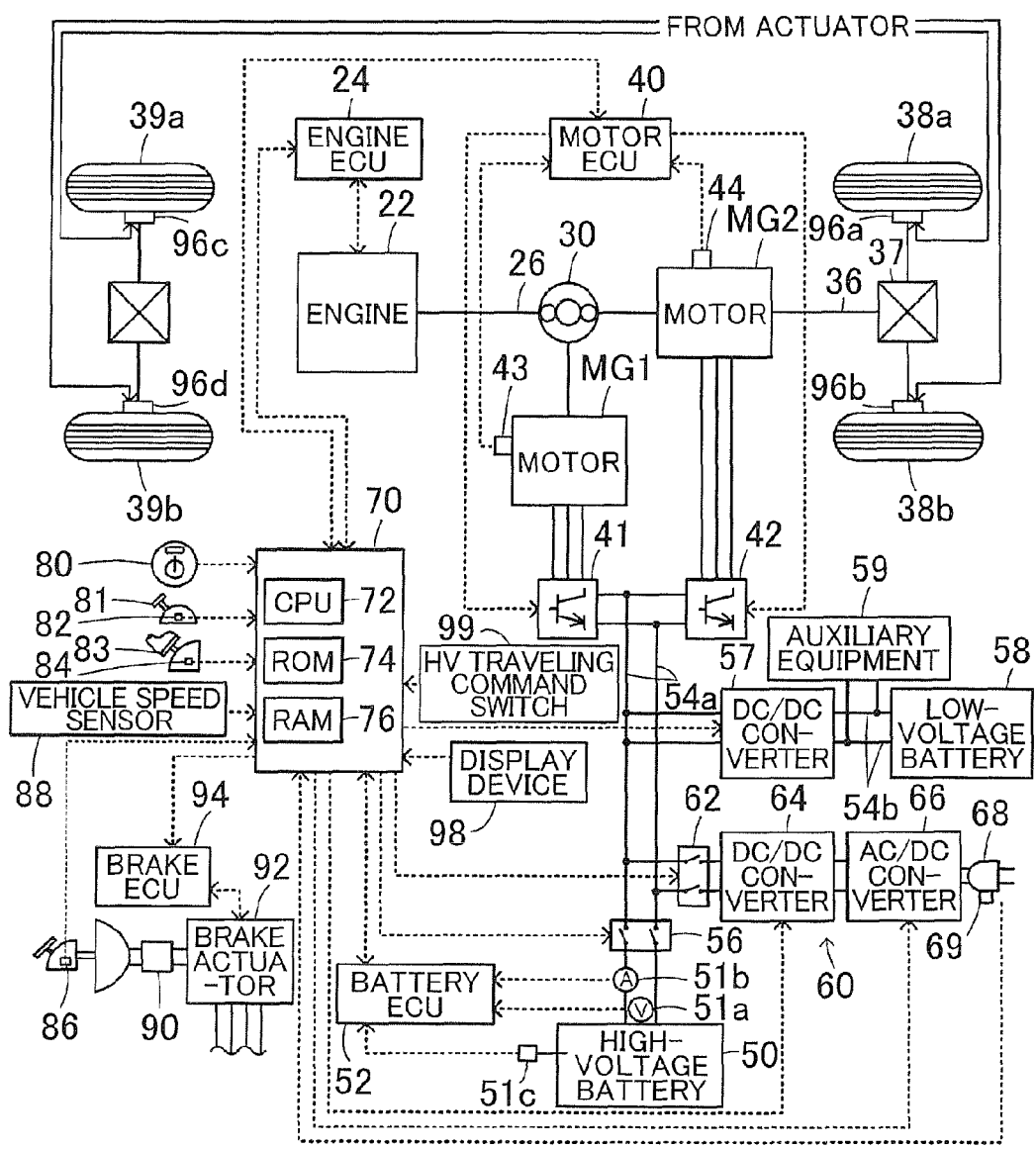
FIG. 1 is a configurational view showing the outline of the configuration of a hybrid vehicle 20 as an embodiment of the invention.

FIG. 1 is a configurational view showing the outline of the configuration of a hybrid vehicle 20 as an embodiment of the invention. As shown in the drawing, the hybrid vehicle 20 of the embodiment includes an engine 22, an engine electronic control unit (hereinafter referred to as an engine ECU) 24, a planetary gear 30, a first motor MG1, a second motor MG2, inverters 41 and 42, a motor electronic control unit (hereinafter referred to as a motor ECU) 40, a high-voltage battery 50, a battery electronic control unit (hereinafter referred to as a battery ECU) 52, a low-voltage battery 58, a direct current-direct current (DC/DC) converter 57, a charger 60, a brake actuator 92, a hybrid electronic control unit (hereinafter referred to as an HVECU) 70, and a display device 98. The engine 22 outputs power by using gasoline or light oil as fuel. The engine ECU 24 performs drive control of the engine 22. In the planetary gear 30, a carrier is connected to a crankshaft 26 of the engine 22 and a ring gear is connected to a drive shaft 36 coupled to drive wheels 38a and 38b via a differential gear 37. The first motor MG1 is configured as, e.g., a synchronous generator-motor and has a rotor connected to a sun gear of the planetary gear 30. The second motor MG2 is configured as, e.g., the synchronous generator-motor and has a rotor connected to the drive shaft 36. The inverters 41 and 42 drive the first and second motors MG1 and MG2. The motor ECU 40 performs the drive control of the first and second motors MG1 and MG2 by performing switching control of switching elements (not shown) of the inverters 41 and 42. The high-voltage battery 50 is configured as a lithium ion secondary battery having a rated voltage of, e.g., 200 V, and exchanges electric power with the first and second motors MG1 and MG2 via a system main relay 56 and the inverters 41 and 42. The battery ECU 52 manages the high-voltage battery 50. The low-voltage battery 58 is connected to an electric power line (hereinafter referred to as a low-voltage electric power line) 54b to which the individual ECUs and auxiliary equipment 59 are connected, and the low-voltage battery 58 is configured as a lead acid battery having a rated voltage of, e.g., 12 V. The direct current-direct current (DC/DC) converter 57 reduces the voltage of electric power from an electric power line (hereinafter referred to as a high-voltage electric power line) 54$a$ that connects the inverters 41 and 42 and the high-voltage battery 50, and supplies the electric power to the low-voltage electric power line 54$b$. The charger 60 is connected to an external power source such as a household power source or the like, and the charger 60 is capable of charging the high-voltage battery 50. The brake actuator 92 controls the brakes of the drive wheels 38$a$ and 38$b$ and wheels 39$a$ and 39$b$ different from the drive wheels 38$a$ and 38$b$. The HVECU 70 controls the entire vehicle. The display device 98 displays various information related to traveling of the vehicle such that a driver can visually recognize the information.

Although not shown, the engine ECU 24 is configured as a microprocessor having a central processing unit (CPU) as the main component. The engine ECU 24 includes a read only memory (ROM) that stores processing programs, a random access memory (RAM) that temporarily stores data, an input/output port, and a communication port in addition to the CPU. To the engine ECU 24, there are input, via the input port, signals from various sensors that detect the state of the engine 22. The signals to the engine ECU 24 includes such as, e.g., a crank position, a cooling water temperature Tw, a throttle position, an intake air amount Qa. The crank position is detected by a crank position sensor that detects the rotation position of the crankshaft 26. The cooling water temperature Tw is detected by a water temperature sensor that detects the temperature of a cooling water of the engine 22. The throttle position is detected by a throttle valve position sensor that detects the position of a throttle valve. The intake air amount Qa is detected by an air flow meter attached to an intake pipe. In addition, from the engine ECU 24, there are output, via the output port, various control signals for driving the engine 22. The various control signals from the engine ECU 24 includes such as, e.g., a drive signal to a fuel injection valve, a drive signal to a throttle motor that adjusts the position of the throttle valve, and a control signal to an ignition coil. The engine ECU 24 communicates with the HVECU 70, controls the operation of the engine 22 with the control signal from the HVECU 70, and outputs data on the operation state of the engine 22 on an as needed basis. Note that the engine ECU 24 also calculates the rotation speed of the crankshaft 26 based on the crank position from the crank position sensor, i.e., the rotation speed Ne of the engine 22.

Although not shown, the motor ECU 40 is configured as a microprocessor having the CPU as the main component. The motor ECU 40 includes the ROM that stores processing programs, the RAM that temporarily stores data, the input/output port, and the communication port in addition to the CPU. To the motor ECU 40, there are input, via the input port, signals required to perform the drive control of the first and second motors MG1 and MG2. The signals to the ECU 40 include such as, e.g., rotation positions $\theta m1$ and $\theta m2$, and phase currents. The rotation positions $\theta m1$ and $\theta m2$ are detected by rotation position detection sensors 43 and 44 that detect the rotation positions of the rotors of the first and second motors MG1 and MG2. The phase currents applied to the first and second motors MG1 and MG2 are detected by a current sensor (not shown). On the other hand, from the motor ECU 40, switching control signals to the switching elements (not shown) of the inverters 41 and 42 are output via the output port. The motor ECU 40 communicates with the HVECU 70, performs the drive control of the first and second motors MG1 and MG2 with the control signal from the HVECU 70, and outputs data on the operation states of the first and second motors MG1 and MG2 to the HVECU 70 on an as needed basis. Note that the motor ECU 40 also calculates the rotation speeds Nm1 and Nm2 based on the rotation positions $\theta m1$ and $\theta m2$ of the rotors of the first and second motors MG1 and MG2 detected by the rotation position detection sensors 43 and 44.

Although not shown, the battery ECU 52 is configured as a microprocessor having the CPU as the main component. The battery ECU 52 includes the ROM that stores processing programs, the RAM that temporarily stores data, the input/output port, and the communication port in addition to the CPU. To the battery ECU 52, there are input signals required to manage the high-voltage battery 50. The signals to the battery ECU 52 includes such as, e.g., an inter-terminal voltage Vb, a charge/discharge current Ib, and a battery temperature Tb. The inter-terminal voltage Vb is detected by a voltage sensor 51$a$. The voltage sensor 51$a$ is disposed between terminals of the high-voltage battery 50. The charge/discharge current Ib is detected by a current sensor 51$b$. The current sensor 51$b$ is attached to an electric power line connected to the output terminal of the high-voltage battery 50. The battery temperature Tb is detected by a temperature sensor 51$c$. The temperature sensor 51$c$ is attached to the high-voltage battery 50. The battery ECU 52 transmits data on the state of the high-voltage battery 50 to the HVECU 70 through communication on an as needed basis. In addition, in order to manage the high-voltage battery 50, the battery ECU 52 calculates a power storage ratio SOC as the ratio of the capacity of electric power that can be discharged from the high-voltage battery 50 to the total capacity based on the total value of the charge/discharge current Ib detected by the current sensor 51$b$, and the battery ECU 52 calculates input and output limits Win and Wout as the maximum allowable electric power for the charge/discharge of the high-voltage battery 50 based on the calculated power storage ratio SOC and the battery temperature Tb. Note that, in the embodiment, it is assumed that the value of the electric power for the discharge of the high-voltage battery 50 is positive, the value of the electric power for the charge of the high-voltage battery 50 is negative, the value of the output limit Wout is positive, and the value of the input limit Win is negative.

The charger 60 is connected to the high-voltage electric power line 54$a$ via a relay 62. The charger 60 includes an alternating current-direct current (AC/DC) converter 66, and a DC/DC converter 64. The AC/DC converter 66 converts AC power from an external power source supplied via a power plug 68 to DC power. The DC/DC converter 64 converts the voltage of the DC power from the AC/DC converter 66 and supplies the DC power to the side of the high-voltage electric power line 54$a$.

The brake actuator 92 is configured to be capable of adjusting a hydraulic pressure for each of brake wheel cylinders 96$a$ to 96$d$ such that the braking force corresponding to the share of the brake in the braking force and a vehicle speed V acts on the wheels (the drive wheels 38$a$ and 38$b$ and the wheels 39$a$ and 39$b$). The braking force caused to act on the vehicle is generated by a pressure (brake pressure) of a brake master cylinder 90 in response to depression of a brake pedal. Also the brake actuator 92 is configured to be capable of adjusting the hydraulic pressure for each of the brake wheel cylinders 96$a$ to 96$d$ such that the braking force acts on the wheels irrespective of the depression of the brake pedal. Hereinafter, the braking force caused to act on the wheel by the operation of the brake actuator 92 is sometimes referred to as a "hydraulic brake". The brake actuator 92 is controlled by a brake electronic control unit (hereinafter referred to as a brake ECU) 94. To the brake ECU 94, there are input signals such as a brake depression force BPF, right and left wheel speeds (hereinafter referred to as drive wheel speeds) Vdr and Vdl, right and left wheel speeds (hereinafter referred to as driven wheel speeds) Vnr and Vnl, a steering angle. The brake depression force BPF is detected by a master cylinder pressure sensor (not shown). The master cylinder pressure sensor is attached to the brake master cylinder 90. The drive wheel speeds Vdr and Vdl are detected by wheel speed sensors (not shown) attached to the drive wheels 38a and 38b. The driven wheel speeds Vnr and Vnl are detected by wheel speed sensors (not shown) attached to the wheels 39a and 39b. The steering angle is detected by a steering angle sensor (not shown). The brake ECU 94 also performs anti-lock brake system (ABS) control, traction control (TRC), and vehicle stability control (VSC). The anti-lock brake system (ABS) control prevents any of the drive wheels 38a and 38b and the wheels 39a and 39b from being locked and slipping when a driver depresses the brake pedal. The traction control (TRC) prevents any of the drive wheels 38a and 38b from slipping by wheel spin when the driver depresses the accelerator pedal. The vehicle stability control (VSC) holds the attitude of the vehicle when the vehicle turns. The brake ECU 94 communicates with the HVECU 70, performs the drive control of the brake actuator 92 with the control signal from the HVECU 70, and outputs data on the state of the brake actuator 92 to the HVECU 70 on an as needed basis.

The HVECU 70 is configured as a microprocessor having a CPU 72 as the main component. The HVECU 70 includes, in addition to the CPU, a ROM 74 that stores processing programs, a RAM 76 that temporarily stores data, and the input/output port and the communication port that are not shown. To the HVECU 70, there are input, via the input port, a push signal, a shift position SP, an accelerator depression amount Acc, a brake pedal position BP, a vehicle speed V, a connection detection signal, and a traveling command signal. The push signal is output in response to a power switch 80. The shift position SP is detected by a shift position sensor 82 that detects the operation position of a shift lever 81. The accelerator depression amount Acc is detected by an accelerator pedal position sensor 84 that detects the depression amount of an accelerator pedal 83. The brake pedal position BP is detected by a brake pedal position sensor 86 that detects the depression amount of a brake pedal 85. The vehicle speed V is detected by a vehicle speed sensor 88. The connection detection signal is detected by a connection detection sensor 69 that detects the connection of the power plug 68 to the external power source. The traveling command signal is output in response to an HV traveling command switch 99. The HV traveling command switch 99 is capable of issuing the command for a hybrid traveling in which the vehicle travels by using power from the engine 22 and power from the second motor MG2 with the intermittent operation of the engine 22 and canceling the command therefor. From the HVECU 70, various signals are output, via the output port. The signals from the HVECU 70 include drive signals to the system main relay 56 and the relay 62, the switching control signals to the DC/DC converter 64 and the AC/DC converter 66, the switching control signal to the DC/DC converter 57, and a display signal to the display device 98. As described above, the HVECU 70 is connected to the engine ECU 24, the motor ECU 40, and the battery ECU 52 via the communication port, and exchanges various control signals and data with the engine ECU 24, the motor ECU 40, and the battery ECU 52.

In the thus configured hybrid vehicle 20 of the embodiment, a requested torque Tr* to be output to the drive shaft 36 is calculated based on the accelerator depression amount Acc corresponding to the depression amount of the accelerator pedal by the driver and the vehicle speed V, and the operation of each of the engine 22 and the first and second motors MG1 and MG2 is controlled such that requested power corresponding to the requested torque Tr* is output to the drive shaft 36. The operation control of the engine 22 and the first and second motors MG1 and MG2 includes a torque conversion operation mode, a charge/discharge operation mode, and a motor operation mode. In the torque conversion operation mode, the operation of the engine 22 is controlled such that the power corresponding to the requested power is output from the engine 22, and the drive of each of the first and second motors MG1 and MG2 is controlled such that all of the power output from the engine 22 is converted to the torque by the planetary gear 30 and the first and second motors MG1 and MG2 and the torque is output to the drive shaft 36.

In the charge/discharge operation mode, the operation of the engine 22 is controlled such that power corresponding to the sum of the requested power and electric power required for the charge/discharge of the high-voltage battery 50 is output from the engine 22, and the drive of each of the first and second motors MG1 and MG2 is controlled such that the requested power is output to the drive shaft 36 with the torque conversion of all or a part of the power output from the engine 22 by the planetary gear 30 and the first and second motors MG1 and MG2, and with the charge/discharge of the high-voltage battery 50. In the motor operation mode, the operation of the engine 22 is stopped and power corresponding to the requested power from the second motor MG2 is output to the drive shaft 36. Note that, since each of the torque conversion operation mode and the charge/discharge operation mode is the mode in which the engine 22, the first motor MG1, and the second motor MG2 are controlled such that the requested power is output to the drive shaft 36 with the operation of the engine 22, and there is no substantial difference in control between the modes, they are referred to as an engine operation mode hereinafter.

In addition, in the hybrid vehicle 20 of the embodiment, in a state where the vehicle is stopped at home or at a predetermined charging point, when the power plug 68 is connected to the external power source and the connection is detected by the connection detection sensor 69, it is determined whether or not the system main relay 56 and the relay 62 are turned on. In a case where the system main relay 56 and the relay 62 are not turned on, they are turned on, and the high-voltage battery 50 is charged with electric power from the external power source by controlling the charger 60. After the charging of the high-voltage battery 50, the vehicle travels in an EV traveling priority mode until the power storage ratio SOC of the high-voltage battery 50 reaches a threshold value Shv (e.g., 20% or 30%) that is set to allow the start of the engine 22. In the EV traveling priority mode, priority is given to an EV traveling in which the vehicle travels by using only the power from the second motor MG2 over the hybrid traveling in which the vehicle travels by using the power from the engine 22 and the power from the second motor MG2. After the power storage ratio SOC of the high-voltage battery 50 reaches the threshold value Shv, the vehicle travels in a hybrid traveling priority mode. In the hybrid traveling priority mode, priority is given to the hybrid traveling over the EV traveling. In the hybrid traveling, the engine 22 and the first and second motors MG1 and MG2 are controlled such that the vehicle travels with the requested power while the power storage ratio SOC is held within a predetermined range having a predetermined control central ratio Sref (Sref1) as its center.

Next, a description will be given of the operation of the thus configured hybrid vehicle 20 of the embodiment, particularly the operation thereof when the accelerator is released in a case where the vehicle travels in the EV traveling priority mode.

Figure 2:
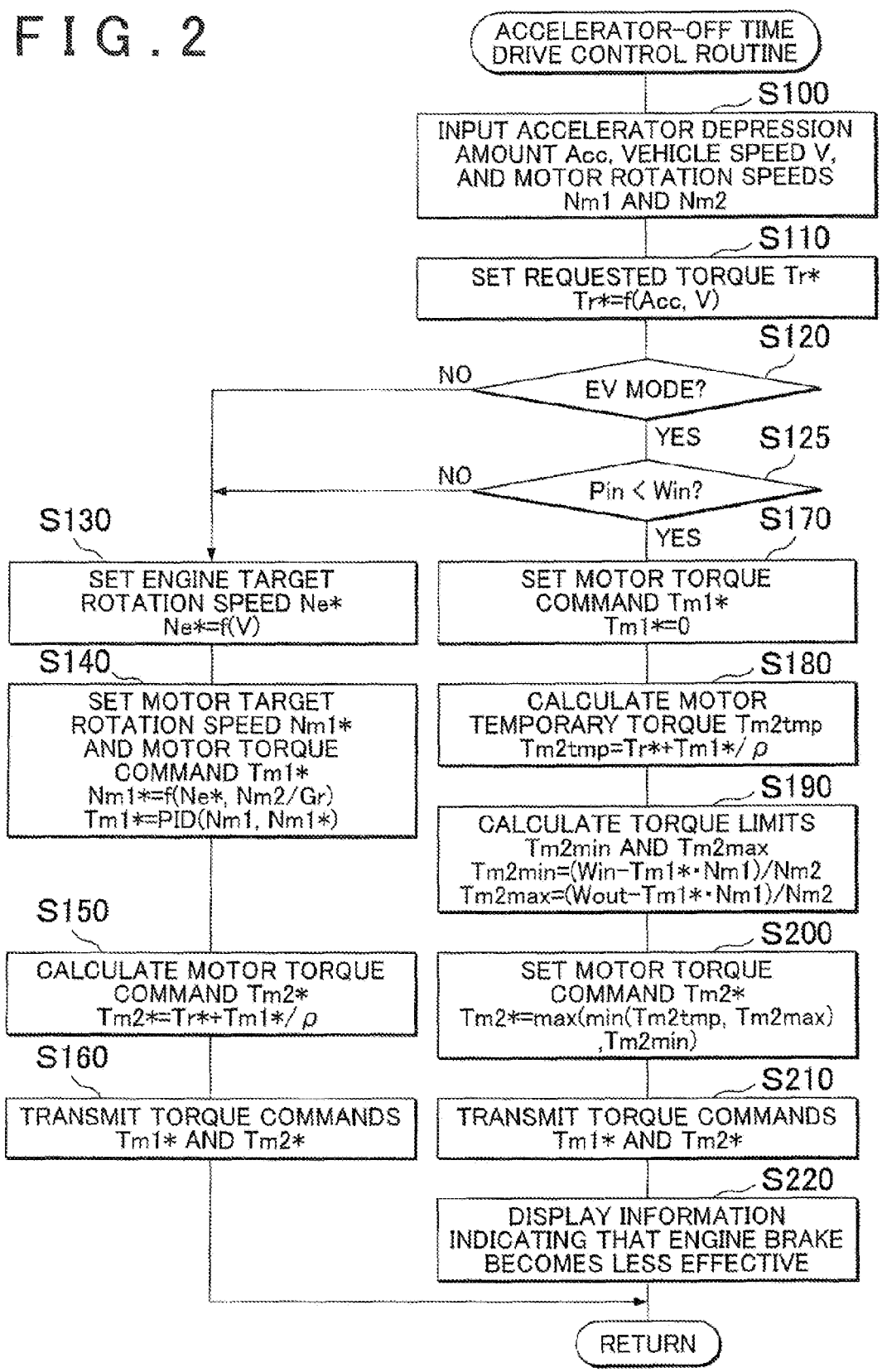
FIG. 2 is a flowchart showing an example of an accelerator-off time drive control routine executed by an HVECU 70.

FIG. 2 is a flowchart showing an example of an accelerator-off time drive control routine executed by the HVECU 70. This routine is repeatedly executed every predetermined time period (e.g., every several msec) at the time when the accelerator is released. Note that, when the accelerator is released and the engine 22 is operated, the HVECU 70 transmits a fuel cut command to the engine ECU 24 concurrently with this routine, and the engine ECU 24 having received the fuel cut command stops the fuel injection and ignition of the engine 22.

When the accelerator-off time drive control routine is executed, first, the CPU 72 of the HVECU 70 executes processing in which data required for the control, such as the vehicle speed V from the vehicle speed sensor 88 and the rotation speeds Nm1 and Nm2 of the first and second motors MG1 and MG2, are input in step S100. Herein, the rotation speeds Nm1 and Nm2 of the first and second motors MG1 and MG2 are calculated based on the rotation positions of the rotors of the first and second motors MG1 and MG2 and are input from the motor ECU 40 through the communication. The rotation positions of the rotors of the first and second motors MG1 and MG2 are detected by the rotation position detection sensors 43 and 44.

Figure 3:
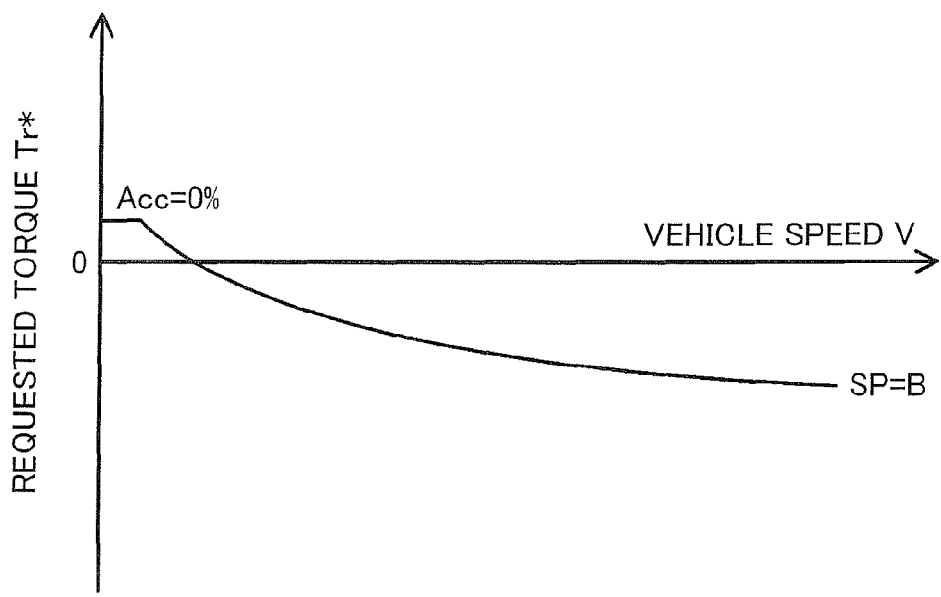
FIG. 3 is an explanatory view showing an example of a requested torque setting map.

When the data is input, the requested torque Tr* to be output to the drive shaft 36 coupled to the drive wheels 38a and 38b is set as the torque requested of the vehicle based on the vehicle speed V in step S110. In the embodiment, the relationship between the vehicle speed V and the requested torque Tr* when the accelerator is released is predetermined and stored in the ROM 74 as a requested torque setting map. When the vehicle speed V is given, the corresponding requested torque Tr* is derived from the stored map and set. FIG. 3 shows an example of the requested torque setting map. As shown in the drawing, the requested torque Tr* is set so as to be reduced (increased as the braking force) as the vehicle speed V is increased.

Figure 4:
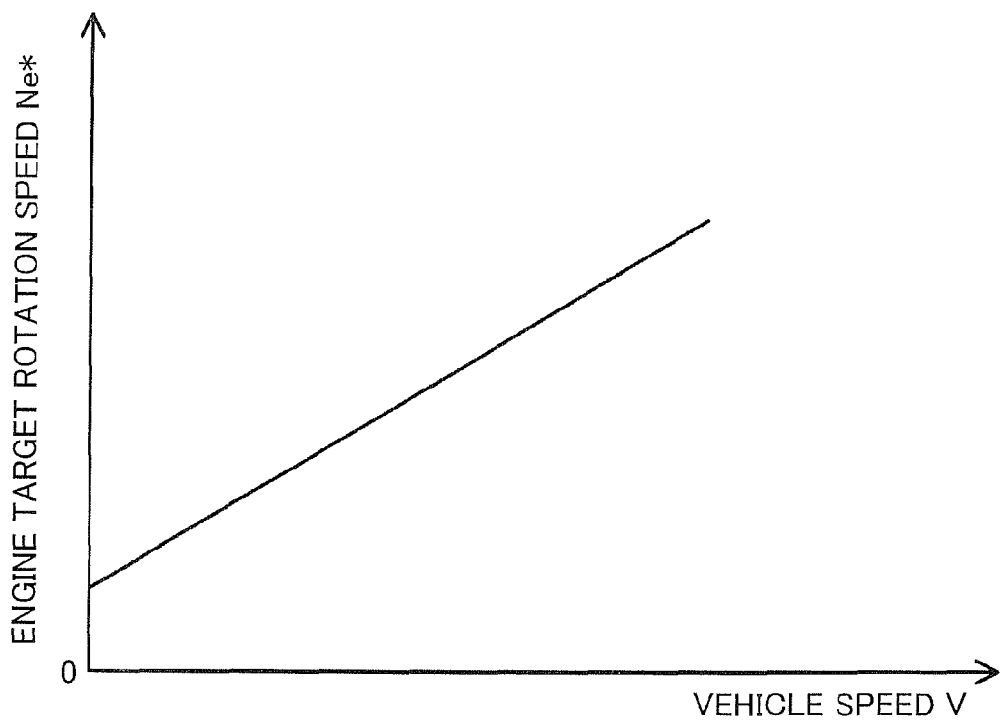
FIG. 4 is an explanatory view showing an example of a target rotation speed setting map.

Subsequently, it is determined whether or not the vehicle travels in the EV traveling priority mode in step S120 and, when the vehicle does not travel in the EV traveling priority mode, a target rotation speed Ne* of the engine 22 is set based on the vehicle speed V in step S130. In the embodiment, the relationship between the vehicle speed V and the target rotation speed Ne* is predetermined and stored in the ROM 74 as a target rotation speed setting map and, when the vehicle speed V is given, the corresponding target rotation speed Ne* of the engine 22 is derived from the stored map and set. FIG. 4 shows an example of the target rotation speed setting map. As shown in the drawing, the target rotation speed Ne* is set so as to be increased as the vehicle speed V is increased.

Figure 5:
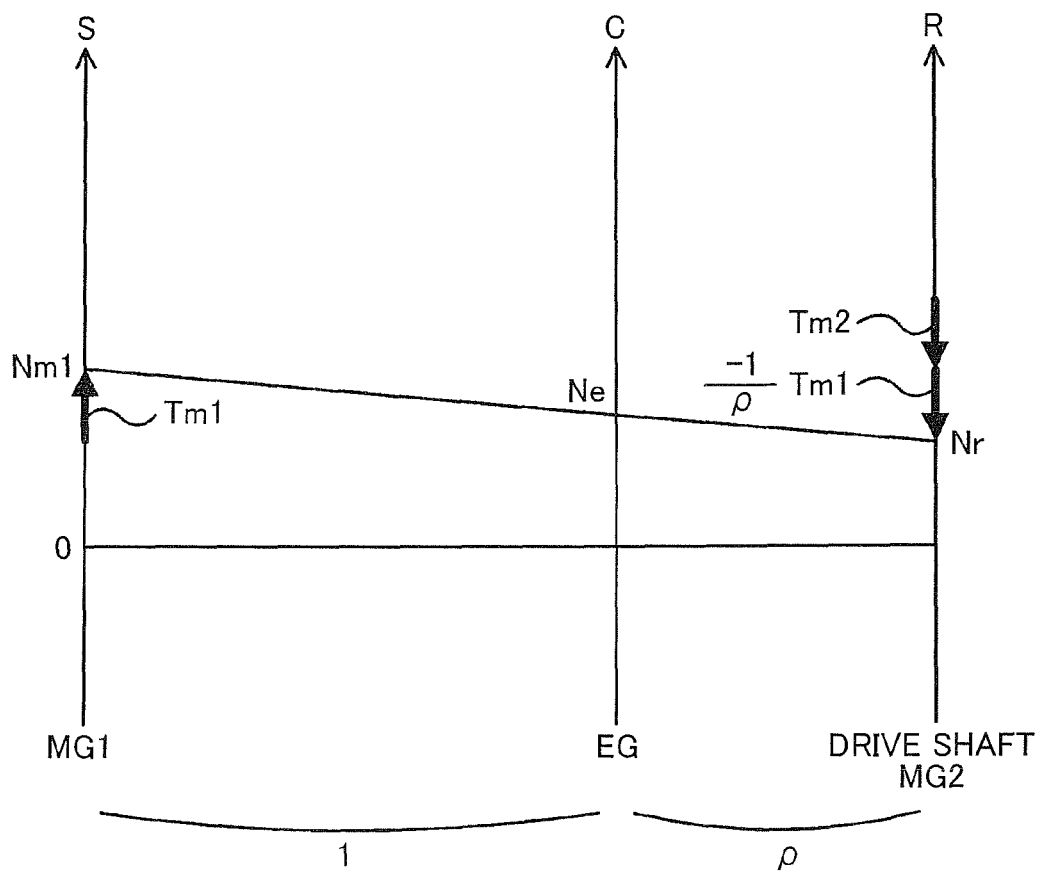
FIG. 5 is an explanatory view showing an example of an alignment chart showing the dynamic relationship between a rotation speed in a rotary element of a planetary gear 30 and a torque, when an accelerator is released.

Thus, when the target rotation speed Ne* of the engine 22 is set, in step S140, a target rotation speed Nm1* of the first motor MG1 is calculated by the following expression (1) by using the target rotation speed Ne* of the engine 22, the rotation speed Nm2 of the second motor MG2, a gear ratio ρ of the planetary gear 30, and a gear ratio Gr of a reduction gear (not shown), and a torque command Tm1* of the first motor MG1 is calculated by the following expression (2) based on the calculated target rotation speed Nm1* and the input rotation speed Nm1 of the first motor MG1. Herein, the expression (1) is a dynamic relation with respect to the rotary elements of the planetary gear 30. FIG. 5 shows an example of an alignment chart showing the dynamic relationship between the rotation speed in the rotary element of the planetary gear 30 and the torque, when the accelerator is released. Note that two thick arrows on an R axis indicate a torque in a case where the torque Tm1 output from the first motor MG1 acts on the drive shaft 36 and a torque in a case where the torque Tm2 output from the second motor MG2 acts on the drive shaft 36 via the reduction gear (not shown). The expression (1) can be easily derived by using this alignment chart. In addition, the expression (2) is a relation in feedback control for rotating the first motor MG1 at the target rotation speed Nm1*. In the expression (2), "k1" in the first term on the right side is a gain of a proportional term, and "k2" in the second term on the right side is a gain of an integral term.

$$Nm1^* = Ne^* \cdot (1+\rho)/\rho - Nm2/(Gr \cdot \rho) \quad (1)$$

$$Tm1^* = k1 \cdot (Nm1^* - Nm1) + k2 \cdot \int (Nm1^* - Nm1) dt \quad (2)$$

Thus, when the motor torque command Tm1* is set, a torque command Tm2* of the second motor MG2 is calculated by the following expression (3) by adding a value obtained by dividing the set torque command Tm1* by the gear ratio ρ of the planetary gear 30 to the requested torque Tr* in step S150, the torque commands Tm1* and Tm2* of the first and second motors MG1 and MG2 are transmitted to the motor ECU 40 in step S160, and the present routine is ended. The motor ECU 40 having received the torque commands Tm1* and Tm2* performs the switching control of the switching elements of the inverters 41 and 42 such that the first motor MG1 is driven with the torque command Tm1* and the second motor MG2 is driven with the torque command Tm2*. With the control mentioned above, when the vehicle does not travel in the EV traveling priority mode, it is possible to output the requested torque Tr* to the drive shaft 36 with the braking force (what is called an engine brake) acting on the drive shaft 36 by running the engine 22 in which the fuel injection is stopped using the first motor MG1 and the braking force acting on the drive shaft 36 by regenerative drive of the second motor MG2.

$$Tm2^* = Tr^* + Tm1^*/\rho \quad (3)$$

When the vehicle travels in the EV traveling priority mode in step S120, subsequently, it is determined whether or not charging electric power Pin for charging the high-voltage battery 50 by the regenerative drive of the second motor MG2 when the processing in steps S130 to S160 described above is executed is less than the input limit Win (whether or not the high-voltage battery 50 is charged with excessive electric power) in step S125. Herein, the charging electric power Pin is electric power obtained by multiplying the motor torque command Tm2* obtained by a method similar to the processing of steps S130 to S150 by the motor rotation speed Nm2.

In a case where the charging electric power Pin is larger than or equal to the input limit Win, that is, the high-voltage battery 50 is not charged with excessive electric power even when the second motor MG2 is regeneratively driven while running the engine 22 using the first motor MG1, the processing in steps S130 to S160 is executed and the present routine is ended. With the above control, with the braking force acting on the drive shaft 36 by running the engine 22 in which the fuel injection is stopped using the first motor MG1 and the braking force acting on the drive shaft 36 by the regenerative drive of the second motor MG2, it is possible to output the requested torque Tr* to the drive shaft 36.

Figure 6:
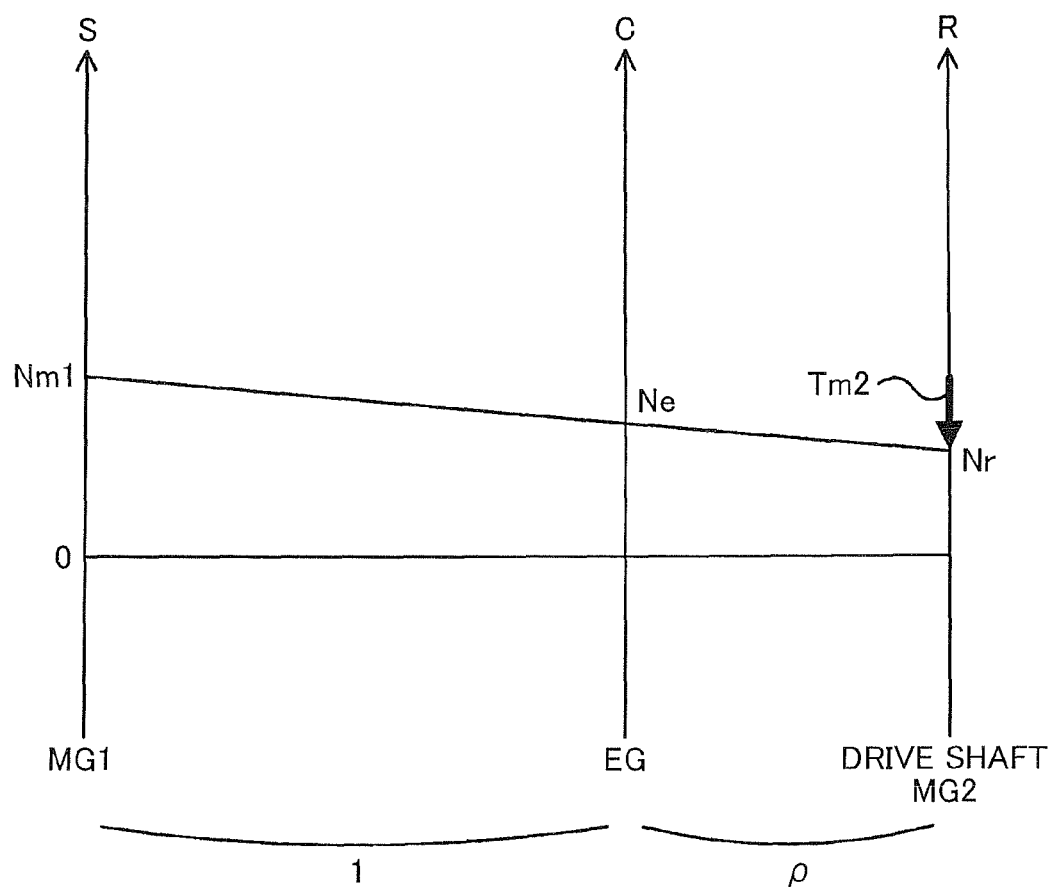
FIG. 6 is an explanatory view showing an example of the alignment chart showing the dynamic relationship between the rotation speed in the rotary element of the planetary gear 30 and the torque, when the accelerator is released.

In a case where the charging electric power Pin is less than the input limit Win, that is, the high-voltage battery 50 is charged with excessive electric power when the second motor MG2 is regeneratively driven while running the engine 22 using the first motor MG1, the value 0 is set as the torque command Tm1* of the first motor MG1 in step S170. The torque obtained by subtracting the torque (−Tm1*/ρ) acting on the drive shaft 36 via the planetary gear 30 when the first motor MG1 is driven with the torque command Tm1* from the requested torque Tr* is set as a temporary torque Tm2tmp as the temporary value of the torque to be output from the second motor MG2 in step S180. Next, as shown in expressions (5) and (6), torque limits Tm2min and Tm2max as the upper and lower limits of the torque that may be output from the second motor MG2 are calculated by dividing differences between the input and output limits Win and Wout of the high-voltage battery 50 and consumed electric power (generated electric power) of the first motor MG1 obtained by multiplying the torque command Tm1* of the first motor MG1 by the current rotation speed Nm1 by the rotation speed Nm2 of the second motor MG2 in step S190. Subsequently, as shown in an expression (7), the torque command Tm2* of the second motor MG2 is set by limiting the temporary torque Tm2tmp with the torque limits Tm2min and Tm2max in step S200. Then, the set torque commands Tm1* and Tm2* of the first and second motors MG1 and MG2 are transmitted to the motor ECU 40 in step S210. FIG. 6 is an explanatory view showing an example of an alignment chart showing the dynamic relationship between the rotation speed in the rotary element of the planetary gear 30 and the torque. The expression (4) can be easily derived by using this alignment chart. With the above control, it is possible to cause the braking force to act on the drive shaft 36 by the regenerative drive of the second motor MG2 within the range of the input and output limits Win and Wout of the high-voltage battery 50 without running the engine 22 using the first motor MG1.

$$Tm2tmp = Tr^* + Tm1^*/\rho \tag{4}$$

$$Tm2min = (Win - Tm1^* \cdot Nm1)/Nm2 \tag{5}$$

$$Tm2max = (Wout - Tm1^* \cdot Nm1)/Nm2 \tag{6}$$

$$Tm2^* = max(min(Tm2tmp, Tm2max), Tm2min) \tag{7}$$

Reasons why the above control is performed will be described. When the engine 22 is run using the first motor MG1, a driver sometimes feels uncomfortable due to vibrations caused by the rotation of the engine 22. Particularly when the EV traveling priority mode is set, since the driver dose not expect the vibrations caused by the rotation of the engine, such vibrations give a greater uncomfortable feeling to the driver. In the embodiment, since running the engine 22 using the first motor MG1 is not performed when the EV traveling priority mode is set, it is possible to suppress the vibrations caused by the rotation of the engine 22, and prevent the driver from feeling uncomfortable due to the vibrations. In addition, since the second motor MG2 is regeneratively driven within the range of the input and output limits Win and Wout of the high-voltage battery 50, it is possible to prevent the high-voltage battery 50 from being charged with excessive electric power. Accordingly, it is possible to suppress the vibrations caused by the rotation of the engine 22 while preventing the high-voltage battery 50 from being charged with excessive electric power.

After the above control is performed, information indicating that "the engine brake becomes less effective" is displayed on the display device 98 in step S220, and the present routine is ended. When the braking force is caused to act on the drive shaft 36 by the regenerative drive of the second motor MG2 within the range of the input and output limits Win and Wout of the high-voltage battery 50 without running the engine 22 using the first motor MG1, in a case where the input limit Win of the high-voltage battery 50 is small as the charging electric power (since the charging electric power is a negative value, the input limit Win is larger as the value), there are cases where the braking force by the regenerative drive of the second motor MG2 becomes smaller than the requested torque Tr* as the braking force (since the braking force is a negative value, the braking force by the regenerative drive of the second motor MG2 becomes larger than the requested torque T as the value). In such cases, the braking force becomes smaller than expected by the driver, and the driver sometimes feels uncomfortable. However, by displaying the information indicating that "the engine brake becomes less effective" on the display device 98, the driver can visually recognize that the braking force becomes small. and it is possible to prevent the situation in which the braking force expected by the driver does not act on the vehicle so that the driver feels uncomfortable.

In the hybrid vehicle 20 of the embodiment described above, in the case where the charging electric power Pin is smaller than the input limit Win of the high-voltage battery 50 when the EV traveling priority mode is set, since the second motor MG2 is regeneratively driven within the range of the input and output limits Win and Wout of the high-voltage battery 50 without running the engine 22 using the first motor MG1, it is possible to suppress the vibrations caused by the rotation of the engine 22 while preventing the high-voltage battery 50 from being charged with excessive electric power.

In addition, by displaying the information indicating that "the engine brake becomes less effective" on the display device 98, it is possible to prevent the situation in which the braking force expected by the driver does not act on the vehicle so that the driver feels uncomfortable.

Figure 7:
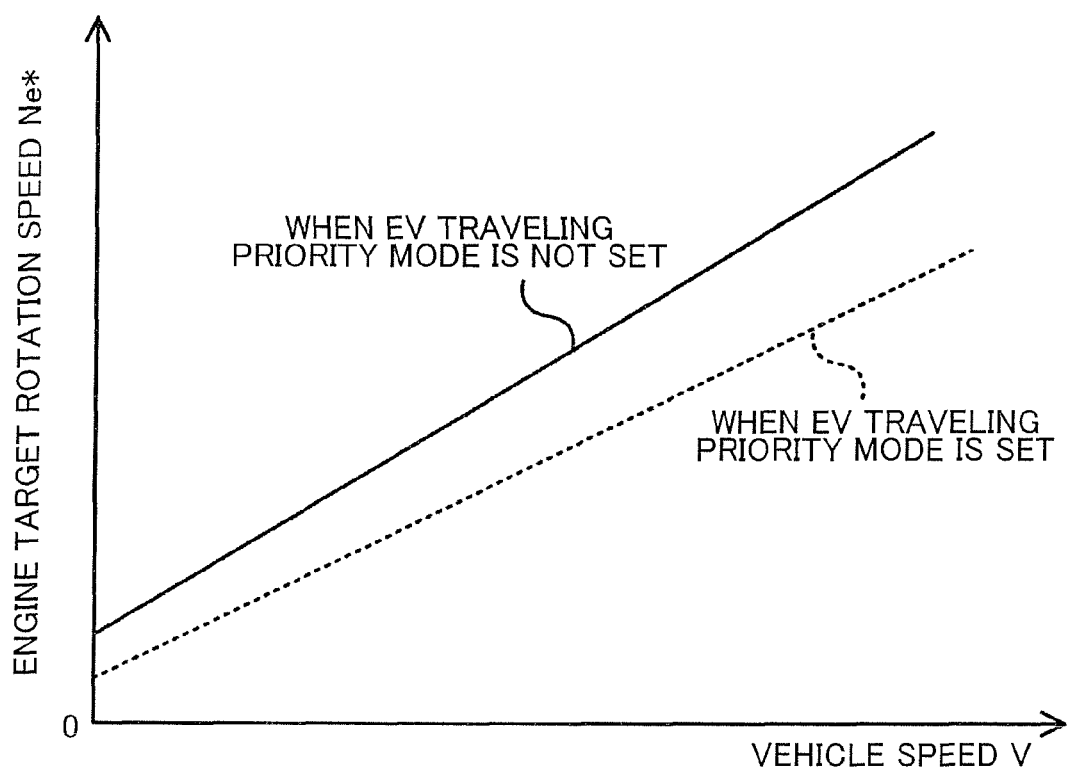
FIG. 7 is an explanatory view showing an example of the target rotation speed setting map in a case where running of an engine 22 using a first motor generator MG1 is performed when an electric vehicle (EV) traveling priority mode is set.

In the hybrid vehicle 20 of the embodiment, in the case where the charging electric power Pin is smaller than the input limit Win of the high-voltage battery 50 when the EV traveling priority mode is set, the torque command Tm1* is set to the value 0 in the processing in step S170, and the engine 22 is not run using the first motor MG1. However, the target rotation speed Ne* of the engine 22 may be set based on the vehicle speed V, the target rotation speed Nm1* of the first motor MG1 may be calculated by the above expression (1) similarly to the processing in step S140, the torque command Tm1* of the first motor MG1 may be calculated by the above expression (2) based on the calculated target rotation speed Nm1* and the input rotation speed Nm1 of the first motor MG1, and the torque command Tm2* may be set by using the calculated torque command Tm1* with the processing in and subsequent to step S180. At this point, as shown in FIG. 7, the target rotation speed Ne* of the engine 22 is preferably set such that the rotation speed of the engine 22 with respect to the vehicle speed V is lower when the EV traveling priority mode is set than the rotation speed thereof when the EV traveling priority mode is not set. With this, in the case where the EV traveling priority mode is set, it is possible to limit the rotation of the engine 22 and suppress the vibrations caused by the rotation of the engine 22 as compared with the case where the EV traveling priority mode is not set. In addition, it is possible to apply the braking force caused by the rotation of the engine 22 to the vehicle, and hence it is possible to prevent the braking force from becoming larger (becoming smaller as the braking force) than the requested torque Tr* by the regenerative drive of the second motor MG2.

In the hybrid vehicle 20 of the embodiment, the second motor MG2 is regeneratively driven within the range of the input and output limits Win and Wout of the high-voltage battery 50 without running the engine 22 using the first motor MG1 when the EV traveling priority mode is set until the power storage ratio SOC of the high-voltage battery 50 reaches the threshold value Shv. However, the second motor MG2 may also be regeneratively driven within the range of the input and output limits Win and Wout of the high-voltage battery 50 without running the engine 22 using the first motor MG1 when an EV traveling command switch (not shown) that issues a command for the EV traveling is turned on and the EV traveling is performed.

In the hybrid vehicle 20 of the embodiment, the information indicating that the rotation of the engine 22 is limited and the engine brake becomes less effective is displayed on the display device 98 in the processing in step S220. However, the above display may not be performed without executing the processing in step S220. In this case, the brake actuator 92 may be controlled such that the braking force (=Tr*−Tm2*) obtained by subtracting the braking force (Tm2*) by the regenerative drive of the second motor MG2 from the requested torque Tr* acts on the vehicle. With this, it is possible to cause the requested torque Tr* to act on the vehicle and cause the braking force expected by the driver to act on the vehicle.

Figure 8:
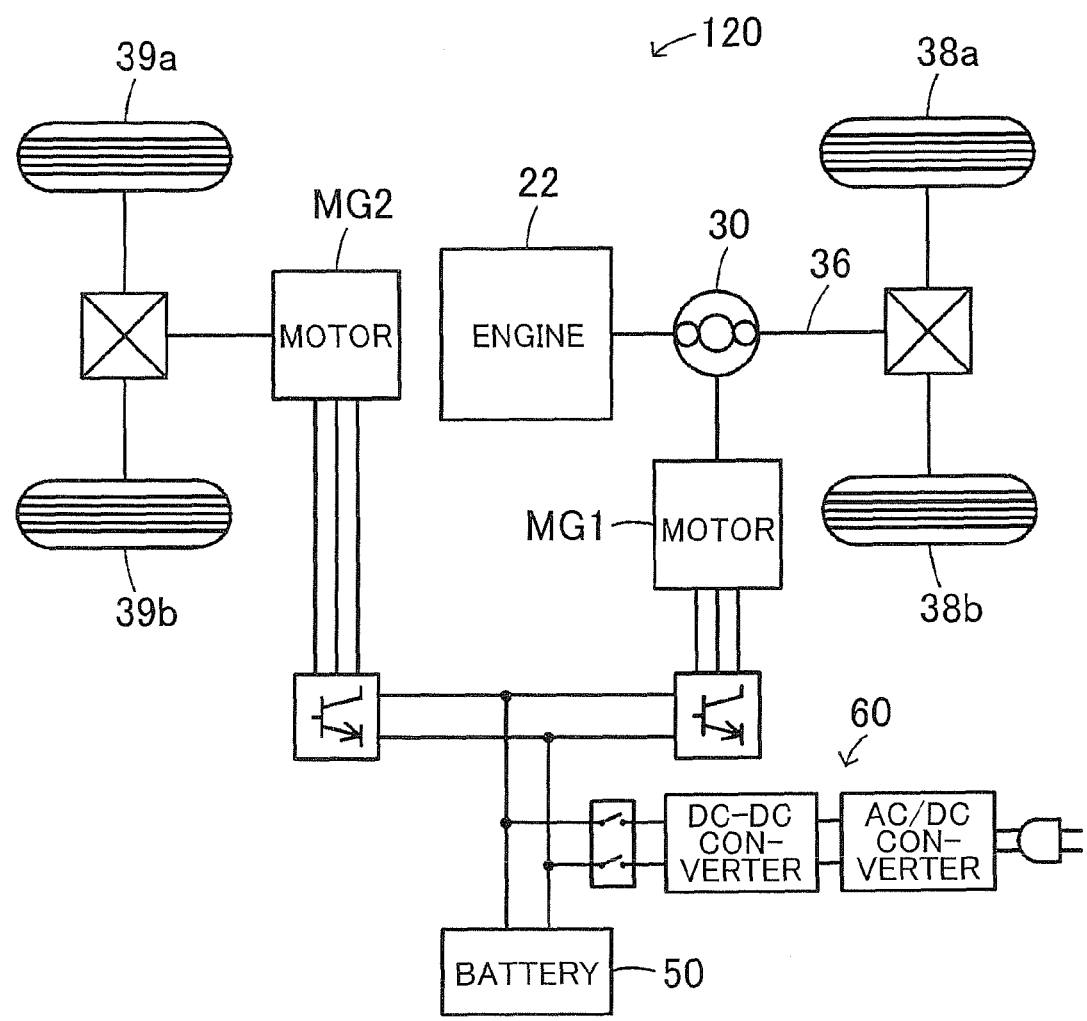
FIG. 8 is a configurational view showing the outline of the configuration of a hybrid vehicle 120 of a first modification.

In the hybrid vehicle 20 of the embodiment, the power from the second motor MG2 is output to the drive shaft 36. However, as shown in a hybrid vehicle 120 of a first modification of FIG. 8, the power from the second motor MG2 may also be output to the axle shaft (the axle shaft connected to the wheels 39*a* and 39*b* in FIG. 1) different from the axle shaft (the axle shaft to which the drive wheels 38*a* and 38*b* are connected) to which the drive shaft 36 is connected.

Figure 9:
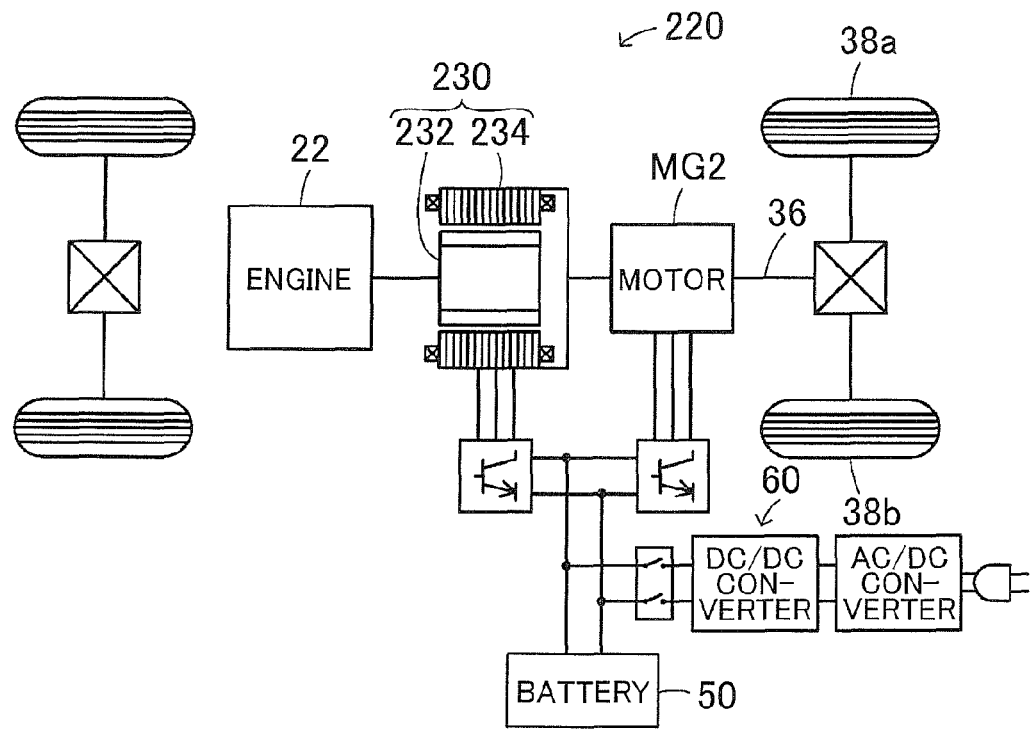
FIG. 9 is a configurational view showing the outline of the configuration of a hybrid vehicle 220 of a second modification.

In the hybrid vehicle 20 of the embodiment, the power from the engine 22 is output to the drive shaft 36 connected to the drive wheels 38*a* and 38*b* via the planetary gear 30. However, as shown in a hybrid vehicle 220 of a second modification of FIG. 9, there may be provided a pair-rotor motor 230 that has an inner rotor 232 connected to the crankshaft of the engine 22 and an outer rotor 234 connected to the drive shaft 36 that outputs the power to the drive wheels 38*a* and 38*b*, and that transmits a part of the power from the engine 22 to the drive shaft 36, and converts the remaining power into electric power.

Figure 10:
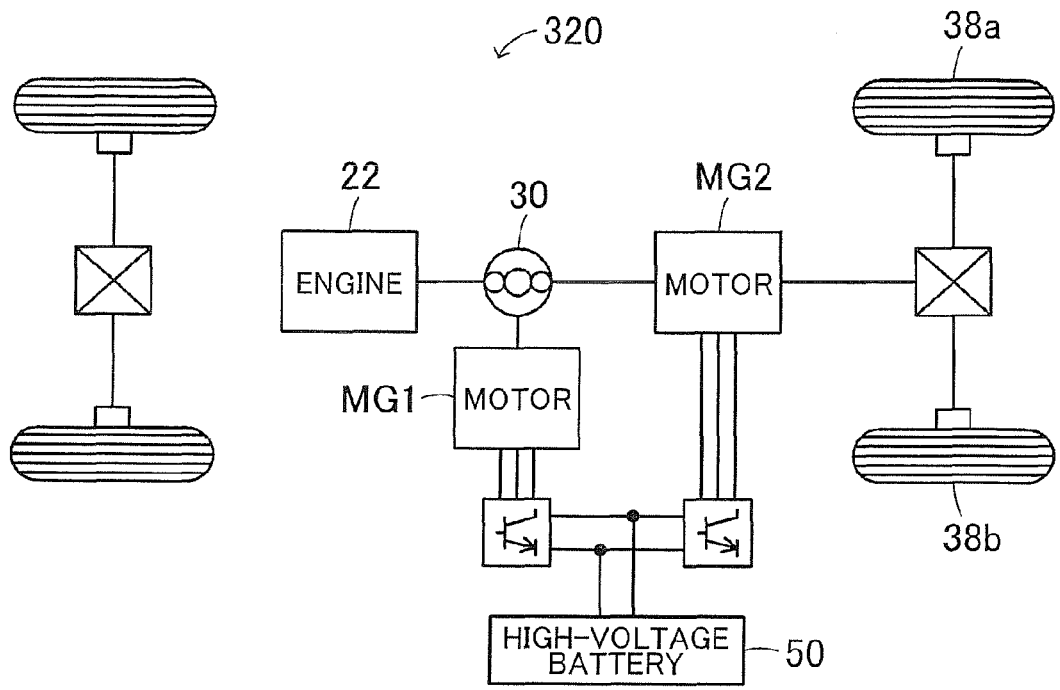
FIG. 10 is a configurational view showing the outline of the configuration of a hybrid vehicle 320 of a third modification.

In the hybrid vehicle 20 of the embodiment, there is provided the charger 60 that is connected to the external power source such as the household power source or the like and is capable of charging the high-voltage battery 50. However, as shown in a hybrid vehicle 320 of a third modification of FIG. 10, the charger 60 may not be provided.

A description will be given of the correspondence between the principal elements of the embodiment and the principal elements of the invention. In the embodiment, the engine 22 corresponds to an "engine", the first motor MG1 corresponds to a "first motor", the second motor MG2 corresponds to a "second motor", the high-voltage battery 50 corresponds to a "battery", and each of the engine ECU 24, the motor ECU 40, and the HVECU 70 that controls the engine 22, the first motor MG1, and the second motor MG2 such that the requested torque Tr* acts on the vehicle when the second motor MG2 is regeneratively driven, and controls the engine 22, the first motor MG1, and the second motor MG2 such that the second motor MG2 is driven within the range of the input and output limits Win and Wout of the high-voltage battery 50 without running the engine 22 using the first motor MG1 in the case where the charging electric power Pin is smaller than the input limit Win of the high-voltage battery 50 when the EV traveling priority mode is set corresponds to a "controller" or an "electronic control unit".

Herein, the "engine" is not limited to the engine that outputs power with hydrocarbon-based fuel such as gasoline or light oil, and the "engine" may be any type of the engine such as a hydrogen engine or the like. The "first motor" is not limited to the first motor MG1 configured as the synchronous generator-motor, and the "first motor" may be any type of the motor as long as the motor is capable of running the engine such as an induction motor or the like. The "second motor" is not limited to the second motor MG2 configured as the synchronous generator-motor, and the "second motor" may be any type of the motor as long as the motor is capable of outputting power for traveling such as the induction motor or the like. The "battery" is not limited to the high-voltage battery 50 configured as the lithium ion secondary battery, and the "battery" may be any type of the battery such as a nickel-metal hydride secondary battery, a nickel-cadmium secondary battery, or a lead battery. The "controller" or the "Θelectronic control unit" are not limited to each of the engine ECU 24, the motor ECU 40, and the HVECU 70 that controls the engine 22, the first motor MG1, and the second motor MG2 such that the requested torque Tr* acts on the vehicle when the second motor MG2 is regeneratively driven, and controls the engine 22, the first motor MG1, and the second motor MG2 such that the second motor MG2 is driven within the range of the input and output limits Win and Wout of the high-voltage battery 50 without running the engine 22 using the first motor MG1 in the case where the charging electric power Pin is smaller than the input limit Win of the high-voltage battery 50 when the EV traveling priority mode is set, and the "controller" may be any controller as long as the controller controls the engine, the first motor, and the second motor such that the requested braking force acts on the vehicle when the second motor is regeneratively driven, and controls the engine, the first motor, and the second motor when the regenerative electric power from the second motor exceeds the maximum charging electric power as the maximum value of the electric power that can be used to charge the battery and priority is given to the motor traveling in which the operation of the engine is stopped and the vehicle travels by using the power from the second motor over the hybrid traveling in which the vehicle travels by using the power from the engine and the power from the second motor such that the second motor is regeneratively driven within the range of the maximum charging electric power while the rotation of the engine is limited to a level lower than the level of the rotation thereof when the regenerative electric power does not exceed the maximum charging electric power.

While the exemplary embodiments have been described, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

What is claimed is:

1. A hybrid vehicle comprising:
   an engine configured to output power for traveling;
   a first motor configured to run the engine;
   a second motor configured to output power for traveling;
   a battery configured to exchange electric power with the first motor and the second motor; and
   an electronic control unit configured to control the engine, the first motor, and the second motor such that a requested braking force acts on the hybrid vehicle when the second motor is regeneratively driven,
   the electronic control unit being configured to, when regenerative electric power from the second motor exceeds a maximum charging electric power and priority is given to a motor traveling over a hybrid traveling, control the engine, the first motor, and the second motor such that the second motor is regeneratively driven within a range of the maximum charging electric power while rotation of the engine is limited to a level lower than a level when the regenerative electric power from the second motor does not exceed the maximum charging electric power, wherein the maximum charging electric power is a maximum value of electric power that can be used to charge the battery, operation of the engine is stopped and the hybrid vehicle travels by using power from the second motor in the motor traveling, the hybrid vehicle travels by using power from the engine and the power from the second motor in the hybrid traveling.

2. The hybrid vehicle according to claim 1 wherein the electronic control unit is configured to give priority to the motor traveling over the hybrid traveling when a power storage amount of the battery is larger than or equal to a predetermined value or when a motor traveling switch that issues a command for the motor traveling is turned on.

3. The hybrid vehicle according to claim 1, further comprising:
a display device configured to display information,
wherein the electronic control unit is configured to control the display device such that the information indicating that the rotation of the engine is limited is displayed when a charging electric power exceeds the maximum charging electric power.

4. The hybrid vehicle according to claim 1, further comprising:
a friction brake device configured to apply braking by a frictional force to the hybrid vehicle,
wherein the electronic control unit is configured to control the engine, the first motor, the second motor, and the friction brake device such that the requested braking force acts on the hybrid vehicle when a charging electric power exceeds the maximum charging electric power.

5. The hybrid vehicle according to claim 1, further comprising:
a planetary gear having three rotary elements that are connected to a drive shaft coupled to an axle shaft, an output shaft of the engine, and a rotating shaft of the first motor respectively,
wherein a rotating shaft of the second motor is connected to the drive shaft.

6. The hybrid vehicle according to claim 5, further comprising:
a charger connected to an external power source and capable of charging the battery by using electric power from the external power source.

7. A hybrid vehicle comprising:
an engine configured to output power for traveling;
a first motor configured to run the engine;
a second motor configured to output power for traveling;
a battery configured to exchange electric power with the first motor and the second motor; and
control means for controlling the engine, the first motor, and the second motor such that a requested braking force acts on the hybrid vehicle when the second motor is regeneratively driven,
the control means controlling the engine, the first motor, and the second motor, when regenerative electric power from the second motor exceeds a maximum charging electric power and priority is given to a motor traveling over a hybrid traveling, such that the second motor is regeneratively driven within a range of the maximum charging electric power while rotation of the engine is limited to a level lower than a level when the regenerative electric power from the second motor does not exceed the maximum charging electric power,
wherein the maximum charging electric power is a maximum value of electric power that can be used to charge the battery, operation of the engine is stopped and the hybrid vehicle travels by using power from the second motor in the motor traveling, the hybrid vehicle travels by using power from the engine and the power from the second motor in the hybrid traveling.

8. A control method for a hybrid vehicle including an engine configured to output power for traveling, a first motor configured to run the engine, a second motor configured to output power for traveling, a battery configured to exchange electric power with the first motor and the second motor, and an electronic control unit,
the control method, executed by the electronic control unit, comprising:
controlling the engine, the first motor, and the second motor such that a requested braking force acts on the hybrid vehicle when the second motor is regeneratively driven; and
controlling the engine, the first motor, and the second motor, when regenerative electric power from the second motor exceeds a maximum charging electric power and priority is given to a motor traveling over a hybrid traveling, such that the second motor is regeneratively driven within a range of the maximum charging electric power while rotation of the engine is limited to a level lower than a level when the regenerative electric power from the second motor does not exceed the maximum charging electric power,
wherein the maximum charging electric power is a maximum value of electric power that can be used to charge the battery, operation of the engine is stopped and the hybrid vehicle travels by using power from the second motor in the motor traveling, the hybrid vehicle travels by using power from the engine and the power from the second motor in the hybrid traveling.

* * * * *